Dec. 11, 1951     C. L. NOELCKE, SR     2,578,369

MULTIPLE POULTRY FEEDER

Filed Oct. 5, 1946

INVENTOR
CARL L. NOELCKE, SR.
BY *Allen & Allen*
ATTORNEYS.

Patented Dec. 11, 1951

2,578,369

UNITED STATES PATENT OFFICE 2,578,369

MULTIPLE POULTRY FEEDER

Carl L. Noelcke, Sr., Cincinnati, Ohio

Application October 5, 1946, Serial No. 701,428

5 Claims. (Cl. 119—53.5)

My invention relates to a feeding device for poultry or small animals which has a number of advantages over feeders hitherto known in the art.

Objects of the invention include the provision of a feeder in which from a given supply of feeding material a large number of birds or animals may be fed simultaneously. Another object of the invention is the provision of a feeder in which grain or other feeding material, dislodged from a feeding trough by the birds during feeding, will not be lost but will be caught and delivered to another feeding trough so as to be available for feeding.

It is an object of my invention to provide a self-contained feeding device of simple and inexpensive construction adapted not only to feed a large number of birds or animals, but capable of being readily cleaned.

It is an object of my invention to provide a feeding device in which the operation of feeding can be suspended at any time as desired, with adequate protection of the feeding material.

These and other objects of my invention which will be set forth hereinafter or will be apparent to one skilled in the art upon reading these specifications I accomplish by that construction and arrangement of parts of which I shall now describe an exemplary embodiment. Reference is made to the accompanying drawings wherein.

In making my exemplary structure I provide a pair of upright end pieces 3 and 4. These may be made of any suitable material including wood; but I prefer to make them of sheet metal with the top, side and bottom edges rolled as shown. These end uprights are in spaced relation, with the elements hereinafter described fastened between them. The bodies of these elements are preferably made of sheet metal.

Figure 2:
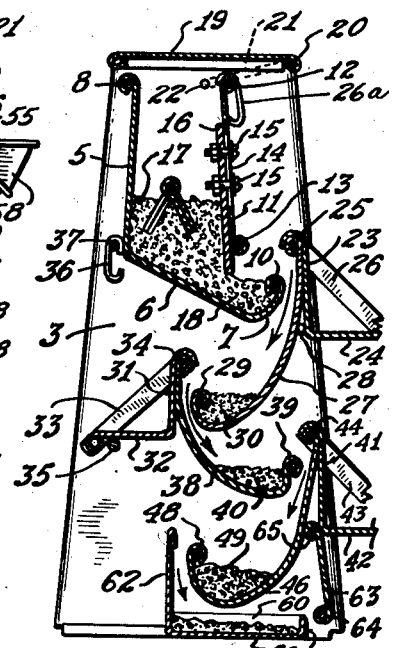
Figure 2 is a sectional view of the exemplary device taken along the line 2, 2 of Figure 1.

I provide a bent sheet metal element having a substantially vertical wall 5, an angularly related transverse wall 6 and an upwardly bent forward wall 7. Both lateral edges of the sheet metal member are rolled or beaded as shown. A rod 8 passes through the upper bead and perforations in the end uprights 3 and 4, where it is suitably fastened. The fastening may be done by riveting, or by providing a head on one end of the rod, threading the other and providing it with a nut 9. A rod 10 passes through the lower bead and is similarly fastened. Another sheet metal wall member 11, having rolled or beaded edges is fastened in my structure in spaced relation to the substantially vertical wall 5, and is held in place by upper and lower rods 12 and 13. The member 11 is provided with slots 14 through which bolts or screws 15 are passed. These engage a partition member 16, lying behind the member 11, and which thus is adjustable as to height. It will be observed in Figures 2 and 3 that the members 5, 6, 11 and 16 form a hopper for grain or other feeding material 17; that the feeding of this material may be gaged or proportioned by regulating the height of the adjustable partition 16; and that the forward end or wall 6 and the upturned wall 7 form a feeding hopper indicated at 18, where the grain or other material becomes available.

I provide a top for my structure, and for the hopper, in the form of a sheet metal member 19 having turned-over ends and side edges which are beaded or rolled as shown. A rod 20 passes through one of these rolls and has its ends bent angularly as at 21 so as to engage pivotwise in perforations 22 in the upper ends of the end uprights 3 and 4. This lid or cover has the advantage of being openable from either side as will be clear.

It will be noted that the trough portion 18 is located a substantial distance above the ground or any floor upon which my structure rests. In order to make the grain in the feeding trough 18 available to the birds or animals, a feeding platform is provided. This comprises a bent sheet metal member having rolled edges and angularly related walls 23 and 24. A rod 25 passing through one of the rolled edges and engaging the end uprights 3 and 4 serves as a suspending and pivoting means for the step-like platform 23, 24. The platform may be rigidified by end brackets 26 which will engage the rod 25 at one end and may either engage a rod passed through the other rolled edge of the platform, or may engage the rolled edge of the platform itself, if no rod is used. The feeding platform, comprising members 23 and 24 is swingable from a feeding position illustrated in Figure 2 to an upper or non-feeding position illustrated in Figure 3. It may be maintained in the latter position by one or more hook members 26a, having portions bent about the rolled upper edge of member 11, and hooked lower ends for engaging the rolled edge of platform member 23. Studs or a rod 28 may be provided as a stop means for the feeding platform to maintain it in its lower position.

Below the wall portions 6 and 7, I provide another sheet metal member 27 of curved configuration, and having rolled edges. The upper edge of this member is maintained in position by the rod 25. The lower edge of the member 27 is retained in position by a rod 29. The member 27 is so shaped as to provide a second feeding trough, indicated at 30. The upper edge of the member 27 is above the upper edge of the trough 18. It will now be seen that grain or other feeding material dislodged by the birds or animals from the trough 18 will be caught by the vertical wall of the member 27 and will be delivered to and collect in the trough 30.

A feeding platform is provided for this trough also, and comprises a sheet metal member with rolled edges having angularly related walls 31 and 32 and bracket means 33. A rod 34 between the upright end pieces supports one edge of this feeding platform as shown. The platform is maintained in feeding position by studs or by an abutment rod 35 engaging the upright end pieces. It is swingable from the feeding position illustrated in Figure 2 to the non-feeding position illustrated in Figure 3, in which latter position it may be maintained by one or more hooks 36 pivoted to a rod 37 passing between the upright end pieces.

Yet another curved sheet metal member with rolled edges is shown at 38. Its upper edge is supported by the rod 34, and its lower edge by a rod 39. Adjacent its lower edge it is formed to present a third feeding trough 40. It will be noted that the upper edge of this member extends higher than the lower edge of member 27 so that grain or other feeding material dislodged from the trough 30 will be delivered to the trough 40.

Figure 3:
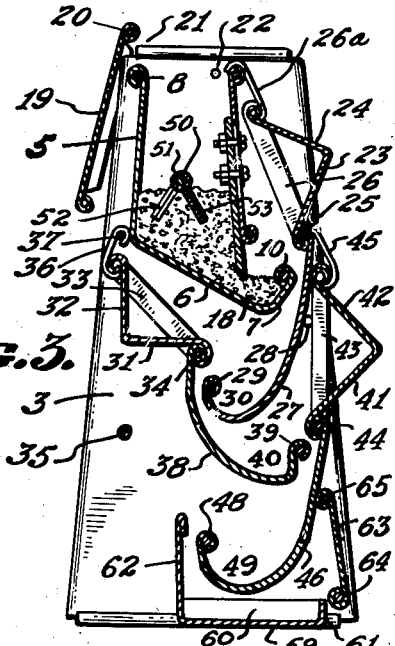
Figure 3 is a similar sectional view showing, however, the feeding platforms in elevated position and the top of the structure open.

A third feeding platform is provided adjacent the last mentioned trough. Again it is a sheet metal member with rolled edges and comprising angularly related wall sections 41 and 42 and brackets 43. It is suspended and pivoted by a rod 44 passing between the upright end pieces. It may be swung to a non-feeding position as shown in Figure 3 and retained in that position by one or more hooks 45 pivoted to the rolled edge of the hopper member supported by the rod 25.

Yet another curved sheet metal member with rolled edges is provided at 46. Its upper edge is supported by the rod 44, and its lower edge by a rod 48, both rods passing between the upright end members 3 and 4. The member 46 is shaped to provide a feeding trough 49. Again the upper end of the member 46 is higher than the edge of trough 40. Grain dislodged from the trough 40 will be directed into the member 46 so as to come to rest in the feeding trough 49.

The feeding trough 49 is preferably located at such a height from the ground or floor on which the device rests that fowls or animals on the floor can reach it. I prefer also to provide a pan to rest on the ground and catch any feeding material dislodged from the trough 49. This pan is a sheet metal structure having a bottom 59, end walls one of which is shown at 60, and side walls 61 and 62. The latter extends upwardly to a height beyond the edge of the trough 49 so that material dislodged from the trough will be directed into the pan.

I may also provide a shield to prevent access to the pan. This shield may be a sheet metal member 63 with rolled edges engaged respectively with rods 64 and 65. The latter rod may serve as a backstop for the feeding platform 42.

In the structure of my invention I have thus provided a hopper for the feeding material which keeps an initial feeding trough filled with the feeding material. I have further provided a descending series of members shaped to present further feeding troughs, and so made and positioned that grain or other feeding material dislodged from an upper feeding trough will not be lost but instead will be delivered to a lower feeding trough, and so on throughout the series until the last or lowest feeding trough is reached. The specific number of feeding troughs in the series does not form a limitation on my invention and may be multiplied or diminished as desired. Since some of the troughs are located at elevated levels, I provide feeding platforms in connection with them so as to make available the feeding material which they contain. I have shown how the feeding platform may, if desired, be utilized in part to deliver feeding material from an upper trough to a lower one; and I have also shown how the construction of the lower trough may be made to serve this purpose. In my preferred embodiment the feeding platforms may be tilted in such a way as to make the feeding material in their respective troughs unavailable so that feeding of fowls or animals may be suspended when desired. The swinging of the feeding platforms to the non-feeding position also serves to provide a high degree of weather protection for the feeding material in the troughs. Weather protection for the feeding material in the hopper is provided by the cover 19.

Figure 1:
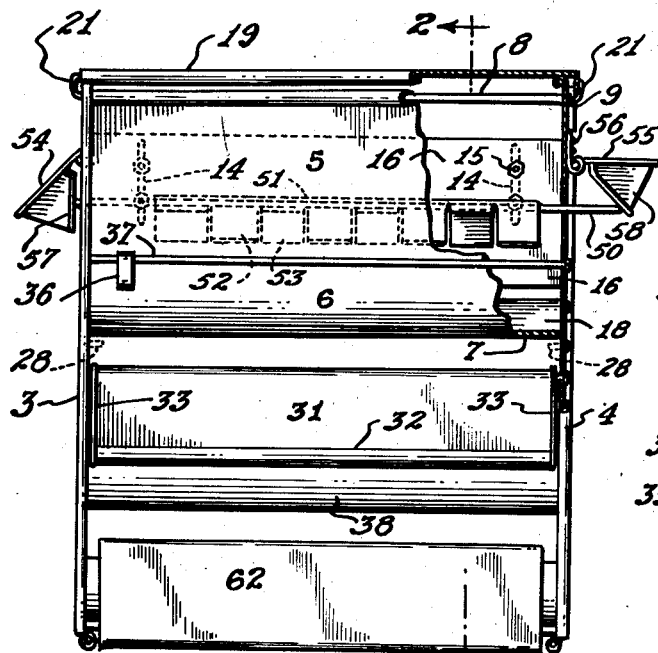
Figure 1 is a side elevational view of my exemplary structure with parts cut away to show interior construction.
Figure 4:
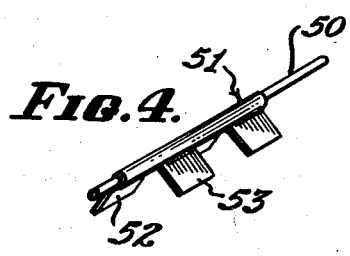
Figure 4 is a partial perspective view of an agitating device which I may employ.

If desired, an agitator may be provided for the grain or other material in the hopper to prevent caking. This agitator may be operated by hand; but it is also possible to provide for its semi-automatic actuation by a fowl. One form of agitator comprises a rod 50, longer than the distance between the upright end supports 3 and 4, the ends of the rod passing through holes in these supports. A sheet metal member 51 is folded about the rod and is slitted in such fashion that it is possible to form double thickness ears 52, 53 etc. which may be bent into angular relation with each other as illustrated in Figure 4. As shown in Figure 1, I provide a pair of platforms 54 and 55 which are pivoted at their ends to brackets 56 on the end uprights 3 and 4. These platforms carry abutment means 57 and 58 for engaging the ends of the rod 50. As will now be evident in Figure 1, if a fowl should alight on the platform 55, its weight will cause that platform to tilt on its pivot, pushing the rod 50 to the left in the figure, producing an agitation of the material in the hopper, and at the same time elevating the platform 54. A reverse movement of the rod can then be produced by the weight of a fowl alighting on the platform 54.

My feeding device presents a number of important advantages. Not only does it prevent loss of feeding material as has been explained above, but it also provides for the feeding of a very much larger number of fowls or animals from the same supply of feeding material. The location of feeding troughs at different effective levels is valuable in tending to segregate fowls or animals of different sizes and permitting all of them to feed. For example, when fowls of different ages and, hence, of different sizes are kept in the same enclosure, the larger fowls will tend to feed at the higher levels, thus leaving the lower levels for the smaller ones. Indeed, it is possible so to locate a feeding platform above the floor or ground that only the smallest fowls can get at the lowest feeding trough. Feeding platforms do not need to be provided for all feeding troughs, especially where the fowls or animals are of different effective heights; but the provision of feeding platforms has a further advantage in that fowls located and feeding on the platforms are protected from interference by fowls on the ground or floor and waiting to be fed.

It is within the spirit of my invention to provide all feeding troughs with feeding platforms and to locate all of them at such a height from the floor or ground that while they are available to taller animals or to fowls on the feeding platforms, no troughs will be available to rats or similar animals on the ground.

The construction of my device may be modified without departing from the spirit of the invention. While I prefer to make the device of sheet metal, it may be made of wood or other materials. Variants of construction are also possible, including the specific arrangement of the descending series of troughs and appurtenances. Hence, having described my invention in one exemplary embodiment, what I claim as new and desire to secure by Letters Patent is stated in the resulting claims:

1. In a poultry feeding device and the like, a pair of spaced, upstanding supports having a plurality of horizontally arranged members extending therebetween, said members being substantially hook-shaped in cross section and having a higher and a lower edge, each member being positioned to provide an upwardly opening feeding trough adjacent its lower edge, said members being arranged in substantially vertical, spaced alignment with successive members facing in opposite directions, the upper edge of each member extending higher than the lower edge of the member next above, and spaced therefrom so as to catch feeding material dislodged from the trough of said member next above and deliver it directly into its own trough.

2. In a poultry feeding device and the like, a pair of spaced, upstanding supports having a plurality of horizontally arranged members extending therebetween, said members being substantially hook-shaped in cross section and having a higher and a lower edge, each member being positioned to provide an upwardly opening feeding trough adjacent its lower edge, said members being arranged in substantially vertical, spaced alignment with successive members facing in opposite directions, the upper edge of each member extending higher than the lower edge of the member next above, and spaced therefrom so as to catch feeding material dislodged from the trough of said member next above and deliver it directly into its own trough, and feeding platforms for said troughs comprising outwardly directed members connected to the upper edges of said members and extending in the direction opposite to that of the hook-shaped member with which it is associated, whereby to provide a feeding platform adjacent the feeding trough of the member next above the member to which said platform is connected.

3. The structure claimed in claim 2 wherein said feeding platforms are hingedly connected to said hooked members and are dimensioned to close the trough next above when tilted from feeding position to a position overlying said trough next above.

4. In a poultry feeding device and the like, a pair of spaced, upstanding supports having a plurality of horizontally arranged members extending therebetween, said members being substantially hook-shaped in cross section and having a higher and a lower edge, each member being positioned to provide an upwardly opening feeding trough adjacent its lower edge, said members being arranged in substantially vertical, spaced alignment with successive members facing in opposite directions, the upper edge of each member extending higher than the lower edge of the member next above, and spaced therefrom so as to catch feeding material dislodged from the trough of said member next above and deliver it directly into its own trough, the uppermost member having an extension on its upper edge and another element spaced from said extension and forming therewith a feeding hopper, said last mentioned element terminating short of the said uppermost member so as to permit feed to escape therebetween.

5. In a poultry feeding device and the like, a pair of spaced, upstanding supports having a plurality of horizontally arranged members extending therebetween, said members being substantially hook-shaped in cross section and having a higher and a lower edge, each member being positioned to provide an upwardly opening feeding trough adjacent its lower edge, said members being arranged in substantially vertical, spaced alignment with successive members facing in opposite directions, the upper edge of each member extending higher than the lower edge of the member next above, and spaced therefrom so as to catch feeding material dislodged from the trough of said member next above and deliver it directly into its own trough, the uppermost member having an extension on its upper edge and another element spaced from said extension and forming therewith a feeding hopper, said last mentioned element terminating short of the said uppermost member so as to permit feed to escape therebetween, and an agitator for said hopper comprising a rod extending through said hopper and through said pair of spaced, upstanding supports, agitating ears on said rod in the area of said hopper, and a pair of platforms pivotally mounted to the outer walls of said upstanding supports above said rod, said platforms having downwardly and outwardly inclined abutment means for engaging said rod, said rod being movable axially a distance to elevate one or the other of said platforms, whereby when a fowl alights on one of the said platforms, its weight will cause that platform to tilt on its pivot, pushing the rod axially, producing an agitation of the material in the hopper, and at the same time elevating the other of said platforms.

CARL L. NOELCKE, Sr.

REFERENCES CITED

The following references are of record in the file of this patent:

UNITED STATES PATENTS

| Number | Name | Date |
| --- | --- | --- |
| 878,621 | Engelbrecht | Feb. 11, 1908 |
| 1,102,004 | Conboie | June 30, 1914 |
| 1,128,971 | Graham | Feb. 16, 1915 |
| 1,205,557 | Metzger | Nov. 21, 1916 |
| 1,410,689 | McCurdy | Mar. 28, 1922 |
| 1,636,658 | Speicher | July 19, 1927 |
| 1,993,445 | Hemstreet | Mar. 5, 1935 |
| 1,996,690 | Schlegel | Apr. 2, 1935 |
| 2,116,361 | Nasman | May 3, 1938 |
| 2,352,859 | Palmer | July 4, 1944 |